(12) United States Patent
Roetheli et al.

(10) Patent No.: US 6,290,885 B1
(45) Date of Patent: Sep. 18, 2001

(54) METHOD OF MAKING A FIBER-REINFORCED MOLDED PLASTIC ROOFING UNIT

(75) Inventors: Joseph C. Roetheli, Kansas City, MO (US); Tony J. Evans, Stilwell; D. Kevin Pratt, Shawnee, both of KS (US); Robert Joseph Alexander, Lamar, MO (US)

(73) Assignee: Poly Proximates, Inc., Stilwell, KS (US)

( * ) Notice: Subject to any disclaimer, the term of this patent is extended or adjusted under 35 U.S.C. 154(b) by 0 days.

(21) Appl. No.: 09/703,956

(22) Filed: Nov. 1, 2000

Related U.S. Application Data (62) Division of application No. 09/143,914, filed on Aug. 31, 1998, now Pat. No. 6,164,034.

(51) Int. Cl.[7] .................................................... B29C 45/40
(52) U.S. Cl. ..................... 264/108; 264/328.18; 264/336; 52/745.19
(58) Field of Search ............................... 264/108, 328.18, 264/328.19, 336, 328.1; 52/745.19

(56) References Cited

U.S. PATENT DOCUMENTS

| | | |
|---|---|---|
| 1,404,483 | 1/1922 | Scharwath et al. . |
| 2,131,043 | 9/1938 | Harshberger et al. . |
| 2,133,854 | 10/1938 | Fischer . |
| 2,168,854 | 8/1939 | Kirschbraun . |
| 3,492,192 | 1/1970 | Bullard, IV . |
| 3,557,515 | 1/1971 | MacCracken . |
| 3,732,345 | 5/1973 | Amos et al. . |
| 3,869,432 | 3/1975 | Gaylord . |
| 3,943,677 | 3/1976 | Carothers . |
| 3,958,069 | 5/1976 | Gaylord . |
| 4,015,391 | 4/1977 | Epstein et al. . |
| 4,058,580 | 11/1977 | Flanders . |
| 4,061,813 | 12/1977 | Geimer et al. . |
| 4,065,899 | 1/1978 | Kirkhuff . |
| 4,263,049 | 4/1981 | Hansen et al. . |
| 4,288,959 | 9/1981 | Murdock . |
| 4,290,248 | 9/1981 | Kemerer et al. . |
| 4,364,979 | 12/1982 | Dutton . |
| 4,376,144 | 3/1983 | Goettler . |
| 4,396,673 | 8/1983 | Ball et al. . |
| 4,481,075 | 11/1984 | Dailly et al. . |
| 4,510,725 | 4/1985 | Wilson . |
| 4,514,947 | 5/1985 | Grail . |
| 4,546,039 | 10/1985 | Horacek et al. . |
| 4,552,797 | 11/1985 | Munk et al. . |
| 4,738,895 | 4/1988 | Takada et al. . |
| 4,739,603 | 4/1988 | Butler . |

(List continued on next page.)

FOREIGN PATENT DOCUMENTS 1141376   2/1983   (CA) .

OTHER PUBLICATIONS

Evonn Gibbs, *Palm Beach Daily Business Review*, He's not faking it: Biotech Resins founder makes synthetic wood from old plastic, sugar–cane waste, May 18, 1996, pp. A1, A6.

*Primary Examiner*—Carl D. Friedman
*Assistant Examiner*—Phi Dieu Tran A
(74) *Attorney, Agent, or Firm*—Stinson, Mag & Fizzell, P.C.

(57) ABSTRACT

The present invention is directed to a method for making a molded roofing unit formed of a fiber-reinforced plastic composition. In a preferred embodiment, the method comprises forming a camber in the roofing unit. The method of the present invention provides consistent results in the molding process, low material and production costs, and produces a roofing product with high rigidity and strength, impact resistance, stability in high wind conditions, and which is easy to install.

4 Claims, 2 Drawing Sheets

U.S. PATENT DOCUMENTS

| | | |
|---|---|---|
| 4,842,877 | 6/1989 | Tyson . |
| 4,966,650 | 10/1990 | DeLong et al. . |
| 5,001,005 | 3/1991 | Blanpied . |
| 5,023,097 | 6/1991 | Tyson . |
| 5,030,289 | 7/1991 | Sattler et al. . |
| 5,070,671 | 12/1991 | Fifield et al. . |
| 5,075,057 | 12/1991 | Hoedl . |
| 5,082,605 | 1/1992 | Brooks et al. . |
| 5,088,910 | 2/1992 | Goforth et al. . |
| 5,094,058 | 3/1992 | Slocum . |
| 5,096,046 | 3/1992 | Goforth et al. . |
| 5,112,278 | 5/1992 | Roberts . |
| 5,196,061 | 3/1993 | Thomas et al. . |
| 5,213,869 | 5/1993 | Magnani . |
| 5,217,800 | 6/1993 | Pentecost . |
| 5,295,339 | 3/1994 | Manner . |
| 5,320,669 | 6/1994 | Lim et al. . |
| 5,323,581 | 6/1994 | Jakel . |
| 5,328,562 | 7/1994 | Rafferty et al. . |
| 5,441,801 | 8/1995 | Deaner et al. . |
| 5,454,911 | 10/1995 | Rafferty . |
| 5,486,553 | 1/1996 | Deaner et al. . |
| 5,502,088 | 3/1996 | Hododi . |
| 5,539,027 | 7/1996 | Deaner et al. . |
| 5,558,933 | 9/1996 | Anthony . |
| 5,593,625 | 1/1997 | Riebel et al. . |
| 5,615,523 | 4/1997 | Wells et al. . |
| 5,624,620 | 4/1997 | Turner . |
| 5,630,305 | 5/1997 | Hlasnicek . |
| 5,635,125 | 6/1997 | Temes et al. . |
| 5,643,359 | 7/1997 | Soroushian et al. . |
| 5,705,216 | 1/1998 | Tyson . |
| 5,711,126 | 1/1998 | Wells . |
| 5,795,680 | 6/1998 | Brooks et al. . |
| 5,879,722 | 3/1999 | Andersen et al. . |

METHOD OF MAKING A FIBER-REINFORCED MOLDED PLASTIC ROOFING UNIT

This application is a divisional of U.S. application Ser. No. 09/143,914, filed on Aug. 31, 1998, now U.S. Pat. No. 6,164,034 which is hereby incorporated herein by reference.

BACKGROUND OF THE INVENTION

1. Field of the Invention

The present invention is generally directed to the field of roofing materials and is more particularly directed to a method of making a molded roofing unit formed from a fiber-reinforced plastic.

2. Description of the Related Art

A number of different roofing products have been developed and used over the years to cover and protect a building. Various factors may be considered in choosing a roofing product including the cost of the product, ease of application or installation, and appearance. Equally important is the performance or weatherability of the roofing product, meaning its ability to withstand cold, rain, hail and wind and to shed snow and endure ice buildup without significant damage. Fire resistance is another important consideration and is increasingly being identified by insurance companies as a desirable attribute for lowering insurance premiums.

Clay tile, concrete, and slate roofs are distinctive and aesthetically pleasing in appearance such that even the "best" neighborhood associations approve the use of these roofing products. Clay, concrete, and slate also generally withstand wide ranging temperatures, rain, snow and wind, and are relatively fire resistant. However, these materials can be expensive, may be susceptible to damage from hail and foot traffic, and the installment is generally labor intensive. Further, slate, concrete, and clay roofing products can be heavy, such that reinforced structures may be required to support their weight.

Wood shakes are also generally approved by most neighborhood associations for residential use and are less expensive than clay, concrete, or slate roofs. Wood shakes are easier to install than clay, concrete, and slate roofs, although measuring and/or squaring of the individual shakes during installation can prove time consuming and the shakes may split during shipment or installation, thereby increasing the overall cost of materials. Wood shakes are also susceptible to hail damage and generally cannot attain a high degree of fire resistance without costly treatment. Wood shakes are often perceived as catching fire relatively easily in the presence of lightening, sparks from fireworks, or other airborne flames. When exposed to water, wood roofing materials may swell or curl along the edges, thereby providing a protruding surface for winds to catch.

Asphalt shingles, also known as composition roofing, are less expensive than wood roofing and are relatively easy-to-install. However, asphalt roofing products generally do not provide the sought after appearance of wood shakes, slate, clay, or tiles, and therefore are not approved for use in some residential areas with high-priced homes. While asphalt roofing is resistant to fire, it is generally prone to hail and wind damage and may need to be replaced over time due to brittling and cracking from exposure to the elements.

Due to the inadequacies of conventional roofing products, various attempts have been made in the past to develop plastic-based roofing materials that possess the desired combination of physical properties, low cost, aesthetic appeal and ease of installation.

For example, U.S. Pat. No. 5,635,125 to Ternes et al. discloses a relatively flat molded shingle formed of ground-up recycled polyvinyl chloride (PVC) particles and wood sawdust particles. U.S. Pat. No. 5,615,523 to Wells et al. discloses a relatively flat shingle panel comprising a resinous plastic material combined with a large amount of filler.

While these prior plastic and/or composite roofing products heretofore developed for replacing conventional roofing products are suitable for such purposes, none of the products developed to date have fully met the desires of the industry. These prior products do not provide the desired aesthetic attributes, nor superior physical properties. Thus, a need remains in the art for an improved plastic composite roofing product that may be made from relatively safe polyolefin materials, recycled and/or virgin, having high impact resistance, wind resistance and fire resistance, with an aesthetically pleasing appearance and that may serve as a drop-in replacement for traditional roofing products at a reasonable cost. To this end, one of the primary objects of this invention is to provide a polyolefin roofing unit reinforced by partially delignified fibers, in which the fibers bind to the plastic to provide a greater degree of wind resistance and impact resistance than previously known in plastic roofing products and with costs comparable to traditional roofing products.

SUMMARY OF THE INVENTION

The present invention is directed to a novel molded roofing product and method of making the same wherein the product is made from a fiber-reinforced plastic composition, is designed to simulate conventional roofing such as wood shakes, slate, concrete, or tile and can be easily installed on the roof of a structure. The roofing product is uniquely configured to provide consistent results in the molding process, low material and production costs, high rigidity and strength, impact resistance, stability in high wind conditions, ease of installation and other functional advantages. The roofing product is inexpensive to manufacture and maintain, while having superior wind, hail and fire resistance over conventional roofing materials such as cedar shakes.

The roofing product consists of discrete roofing units which may be applied to the roof of a building or other structure to protect the structure from rain, snow, ice, wind, hail, sun, wildlife, and other natural elements. The molded roofing units may be installed on the roof in a fashion similar to conventional asphalt shingles or wood shakes wherein the units are secured in place, one above the other, with nails, staples or screws.

The molded roofing units are formed from a fiber-reinforced plastic composition having impact resistance greater than 1.1 ft-lb/in to reduce hail damage, superior flex modulus ranging from 275,000 to 600,000 psi to withstand strong winds, and at least a class C fire rating to reduce the risk of fires.

The fiber-reinforced plastic composition preferably comprises a plastic compounded with partially delignified agricultural or forestry fibers that strongly bind to the plastic and thereby provide superior reinforcement to the roofing product. The plastic is preferably selected from one or more polyolefin plastics recycled from waste materials. The partially delignified fibers preferably are derived from fibers having an aspect ratio (length to diameter×1,000 of the fiber) greater than 60, and most preferably greater than 100, to provide strength and stiffness to the product.

In a preferred embodiment of the invention, a polyolefin plastic comprised of cleaned waste plastics, such as high-density polyethylene (HDPE) and polypropylene, is compounded with partially delignified cellulosic fibers derived from waste forestry or agricultural materials, such as wheat straw, sugar cane bagasse, or wood cellulose. These cellulosic fibers may be partially delignified by any means known in the art to disrupt the lignin holding the individual fibers and fibrils together so as to increase the fiber surface area to which the plastic can bond. Most preferably, the cellulosic fibers are delignified by steam explosion, such as by the method described in U.S. Pat. No. 5,705,216 to Tyson (hereinafter the "Tyson '216 Patent") or in U.S. Pat. No. 4,966,650 and Canadian Patents Nos. 1,141,376 and 1,096,374 to DeLong (hereinafter the "DeLong Patents"), in a manner to "open" the individual fibers into an expanded fibrous micromesh matrix of fibrils, thereby enabling the plastic to flow into and bind with the fibers and fibrils. The fiber and fibril-plastic binding yields added strength, rigidity, and impact resistance, while providing resistance against chemical attack, insect infestation, and frost damage. Optionally, the delignified fibers may also be mechanically defibrillated to further dissociate the individual fibers and fibrils.

In addition to the polyolefin plastics, additional thermoplastics such as nylons and engineered thermoplastic polyolefins (TPO) may be included within the composition to increase the impact resistance and stiffness of the roofing unit. It has also been found advantageous to incorporate additives into the fiber-reinforced plastic composition to produce additional desirable properties. Fire retardants such as alumina trihydrate (ATH) may be added to achieve a fire rating superior to the Class C (residential) rating. Bonding agents such as Epolene may be added to further enhance bonding of the fibers and plastic. Fillers may be added to reduce the overall materials cost, and U-V protectants may be added to prevent environmental stress cracking, discoloration, oxidation and to increase overall longevity. Further, a foaming agent may be incorporated to enhance impact resistance and to reduce the weight of the roofing product and the volume of plastic required.

The molded roofing units are uniquely configured to simulate conventional roofing products such as wood shakes, slate, concrete, or tile, while providing consistent results in the molding process, low material and production costs, high rigidity and strength, impact resistance, stability in high wind conditions, ability to shed snow and minimize ice damage, resistance to water uptake, ease of installation and other functional advantages. Each roofing unit includes a generally flat solid upper tab section intended to be secured to the roof structure using nails, screws, staples or other conventional means, and a raised lower exposed section preferably having surface ridges or other textural features to provide a desired appearance and functional advantages.

In a preferred embodiment, the top surface of the lower exposed section will include relatively high and broad ridges configured to deflect and evenly distribute forces placed upon the unit, such as by hail, throughout a larger surface area of the unit, and valleys configured to direct water along the top surface of the unit and over its lower edge. While the lower exposed section is raised so as to appear relatively thick, adding dimension and texture to the roof when viewed from the ground, the central underside of the exposed section includes a hollow cavity so as to reduce the materials cost and amount of cooling time needed when producing the molded unit. The hollowed cavity includes a series of ribs that reinforce the unit and assist in evenly distributing any force placed upon the unit, such as by hail or foot traffic.

In a preferred embodiment, the molded unit has an upwardly arched shape forming a camber along the midsection of the unit. When the tab section is nailed to the roof, both ends of the unit are held down by the slight stress resulting from the flattened camber, thereby preventing the ends of the unit from raising during high winds. An index line extending transversely across a midsection of the unit between the upper tab section and the lower exposed section is also preferably included to assist the installer in accurately aligning and squaring the units in overlapping relationship with one another.

In use, a first molded unit is squarely positioned on the roof structure so that the upper tab section is positioned above the lower exposed section on the roof. The tab section is physically secured to the roof by securing nails, staples, screws or other conventional means through the tab section. A second molded unit may be secured in overlapping relationship with the first unit by positioning the lower exposed section of the second unit over the upper tab section of the first unit. These adjacent units may be more accurately and easily aligned by positioning the bottom edge or end of the second unit along the index line of the underlying first unit.

Although the following detailed description and drawings are directed to a preferred embodiment wherein the roofing unit simulates a conventional cedar shake, the present invention may be applied to a variety of roofing components, including units which simulate slate, tile, or other roofing, as well as ancillary roofing components such as ridges, vents, and the like.

DETAILED DESCRIPTION OF THE PREFERRED EMBODIMENTS

The present invention is directed to a molded roofing unit formed of a fiber-reinforced plastic composition configured to simulate the appearance of a conventional roofing product, such as a cedar shake, slate, or tile roofing product.

Fiber-Reinforced Plastic Composition

The fiber-reinforced plastic composition utilized to form the roofing unit of the present invention has the combined characteristics of high impact resistance, wind resistance and fire resistance, a combination heretofore not achieved in conventional or plastic and/or composite roofing materials at comparable prices of cedar shakes. The high impact resistance of the fiber-reinforced plastic is reflective of the high hail resistance of a molded roofing unit comprised of the fiber-reinforced plastic. The Izod impact rating of the fiber-reinforced plastic ranges from 1.1 to 1.8 ft-lb/in, preferably greater than 1.2 ft-lb/in, more preferably from 1.3 to 1.8 ft-lb/in, and most preferably greater than 1.35 ft-lb/in, as measured by ASTM D256-93A.

The fiber-reinforced plastic composition of the present invention also has a flex modulus that can withstand most high winds to which it may be exposed on the roof of a structure. The fiber-reinforced plastic composition has a flex modulus rating ranging from 275,000 to 600,000 psi, preferably between 300,000 and 375,000 psi, more preferably greater than 300,00 psi and most preferably ranging from 320,000 to 350,000 psi, as measured by ASTM D790-92.

In addition, the fire resistance rating of the fiber-reinforced plastic, as measured by ANSI/UL 790, generally ranges from Class A to Class C. Class C is the equivalent of a residential roofing rating. The preferred embodiment of the fiber-reinforced plastic that is molded into the roofing unit has at least a Class C fire rating.

A fiber-reinforced plastic composition consistent with the present invention will have additional benefits over previously known materials utilized for roofing units. For example, a fiber-reinforced plastic consistent with the present invention is naturally resistant to most rodents and insects, including termites. In addition, the fiber-reinforced plastic can be produced at a reasonable cost relative to other known plastic and/or composite materials utilized in forming roofing units. Further, the fiber-reinforced composition does not "wick" water and can therefore be used in lower pitched roofs than can cedar shakes.

The fiber-reinforced plastic composition preferably comprises a polyolefin compounded with partially delignified cellulosic fibers, wherein the fibers adhere to the polyolefin rather than serving merely as a filler. The composition preferably comprises polyolefin in amounts ranging from 50 to 80 percent by weight, and most preferably from 55 to 65 percent by weight of the total composition. The composition preferably comprises partially delignified fiber in amounts ranging from 20 to 50 percent by weight, and most preferably ranging from about 30 to 45 percent by weight of the total composition.

Any moldable polyolefin or mixture of polyolefins may be used for purposes of the present invention, including high and low density polyethylene, polypropylene, ionemers, other copolymers, including engineered thermoplastic polyolefins (TPO), which may consist of polypropylene compounded with rubber. The polyolefin components are preferably selected from the group consisting of HDPE and polypropylene, and most preferably from post consumer or post industrial waste plastics, specifically waste HDPE, such as that reclaimed from used milk jugs. It should be apparent to one skilled in the art that virgin plastic may be used equally effectively, although the benefit of productively utilizing waste plastic is then lost. By incorporating a mixture of HDPE and polypropylene, little separation of the waste plastic is required. Preferably the HDPE to polypropylene ratio is between 70:30 to 100:0 by weight of the total composition, and most preferably is from 85:15 to 100:0 by weight of the total composition.

The use of polyolefins in the molded roofing unit is preferable to the known use of PVC in plastic and/or composite roofing materials. Polyolefins are relatively low cost thermoplastic materials that can be obtained in a host of grades and characteristics and are readily available as recyclable waste materials. Polyolefins have relatively high impact resistance and unlike PVC are not considered a potential health risk.

The fiber utilized to reinforce the plastic comprising the molded roofing unit of the present invention is a cellulosic fiber that has been at least partially delignified so as to enhance bonding with the plastic. Any method for partially or fully delignifying cellulosic fibers so as to disrupt the lignin holding the fibers and the component fibrils together is considered acceptable for purposes of this invention. A preferred method known for delignification includes steam explosion, whereby the fibers separate and "expand" into a micromesh matrix of fibrils as they are released from a high pressure steam chamber. Two steam explosion methods consistent with the preferred invention are disclosed in U.S. Pat. No. 5,705,216 to Tyson (hereinafter the "Tyson '216 Patent"), and in U.S. Pat. No. 4,966,650 and related Canadian Patents Nos. 1,141,376 and 1,096,374 to DeLong (hereinafter the "DeLong Patents"), each of which is hereby incorporated herein by reference. In addition, the partially delignified fibers can optionally be mechanically fibrillated to further dissociate the individual fibers and fibrils as disclosed in the Tyson '216 Patent.

The fibers may be derived from agricultural or forestry fibers having an aspect ratio (length to diameter×1,000 of the fiber) greater than 60, preferably ranging from 60 to 150, more preferably 80 to 130, and most preferably near or above 100. The length of the fibers is an important factor in the aspect ratio and should exceed 1.0 mm, preferably exceeding 1.5 mm. Small diameter fibers are preferable over thick fibers; fibers should be under 30 microns in diameter and preferably under 20 microns. Such fibers are preferably waste materials or byproducts of other processes. The fibers may be selected from the group consisting of barley, wheat or rice straw, soy stalks, stalks of perennial and annual grasses, sugar cane bagasse, kenaf, sawdust, other forest product residues, and other plant materials. The most preferred fibers are wheat straw and sugar cane bagasse.

A wide variety of additives may be combined with the fiber and the plastic to enhance the properties of the molded roofing unit. Additives consistent with the invention include, but are not limited to, U-V protectants, impact modifies, fire retardants, bonding agents, colorants and fillers. The additives, with the exception of impact modifiers, generally replace equal weight-percentages of fiber and polymer. For example, when a fire retardant is added in an amount equal to 30 percent by weight of the total composition, the percentages of fiber and polymer are decreased equally by 15 percent by weight of the total composition. Impact modifiers replace only plastic.

In the preferred embodiment of the invention, U-V protectants such as Tinuvin 783 FB and/or Irganox B225F, both manufactured by Ciba Geigy, may be added to the composition in a total amount ranging from 0.3 to 1.2 percent by weight of the total composition, with a preferred range of total U-V protectant of 0.8 to 1.0 percent by weight, and a most preferred amount of about 1.0 percent by weight. The U-V protectants control cracking and minimize color changes resulting from exposure to ultra-violet radiation. Although Ciba Geigy U-V protectants are referenced for illustrative purposes, it will be recognized that other suppliers offer similar products that serve similar functions.

Up to 30 percent by weight of the total composition may be comprised of various impact modifiers selected from the group consisting of low density polyethylene (LDPE), TPO, and nylons. These impact modifiers are preferably added in amounts ranging from 0 to 30 percent by weight and most preferably 10 to 15 percent. Impact-modifying polymers offer high resistance to impact, such as hail, and high resistance to environmental stress cracking.

Bonding agents, such as Epolene, may be added to enhance bonding of fibers and polyolefins in the range of 0 to 5 percent by weight of the total composition, with a preferred range of 2 to 3 percent.

Fire retardants may also be added in amounts up to 30 percent by weight of the total composition, with a preferred amount ranging from 16 to 24 percent and a most preferred amount of approximately 20 percent by weight of the total composition, to achieve fire ratings in excess of Class C (residential). The addition of 20 percent by weight of the total composition of Micral 1500 ATH, a fire retardant sold by J. M. Huber, would be consistent with the present invention.

The natural color of the fiber-reinforced plastic of the preferred embodiment of the present invention is a gray color very similar to the color of an aged cedar shake. However, colorants can be added to produce a product of a specific desired color. Conventional colorants dispersed in either polyethylene or polypropylene may be used, although adjustments must be made to compensate for the colors of the recycled plastic and fiber. One of ordinary skill in the art would be able to calculate the amount and type of colorant necessary to produce a molded roofing unit of a desired color without undue experimentation. Preferably the colorant is added in an amount ranging from 0 to 5 percent by weight of the total composition.

Fillers, such as XPLE cable insulation produced by Alcan Aluminum, may also be added in amounts up to 15 percent by weight of the total composition, more preferably between 3 and 10 percent by weight, to reduce the materials cost of the shake. Other thermoset plastic wastes may also be used as fillers with some sacrifice of desired properties.

Polyethylene-compatible foaming agents, such Ready International's SAFOAM-PE50, may also be added to the composition. The amount of foaming agent can range up to 3 percent by weight of the total composition, preferably about 1.5 percent. The foaming agent improves insulation and impact resistance, reduces the weight of the roofing unit, reduces the cycle times and reduces the volume of polyolefin required for construction of the roofing composition. Weight reductions of 10 to 18 percent may be achieved by the addition of a foaming agent.

Molded Roofing Unit Configuration

Figure 1:
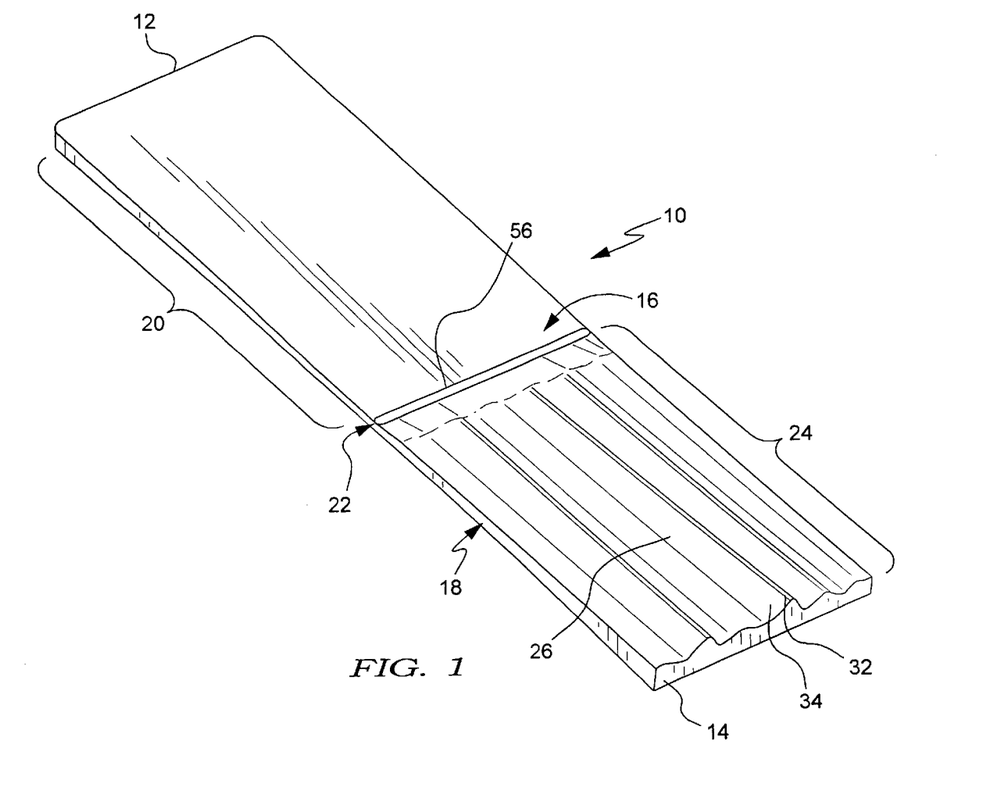
FIG. 1 is a perspective view of a molded roofing unit in accordance with the preferred embodiment of the present invention.
Figure 2:
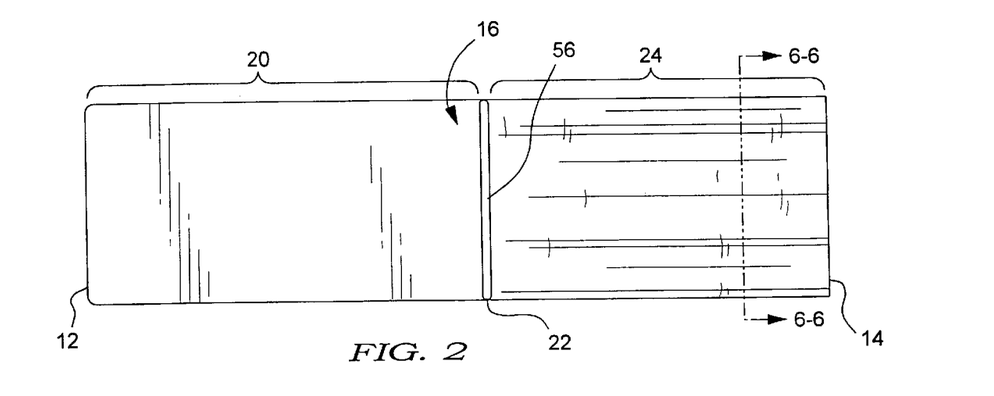
FIG. 2 is a top plan view of the molded roofing unit of FIG. 1.

Turning to FIG. 1, a molded roofing unit in accordance with the present invention is generally designated by the numeral 10. Unit 10 is a relatively planar elongate shingle extending a length from an upper end 12 to a lower butt end 14, having a top side 16 intended to face outwardly from the roof when installed, and an underside 18 intended to face inwardly toward the roof and rest flush against the roof and/or underlying roofing unit when installed. The unit is preferably integrally formed within a mold as a single unitary piece of fiber-reinforced plastic as heretofore described.

The roofing unit has a relatively thin flat upper tab section 20 extending a length from upper end 12 to a lower tab end 22, and a lower exposed section 24 extending a length from lower tab end 22 to butt end 14. The overall length of the unit and of upper tab and lower exposed sections 20 and 24 will vary depending upon the desired appearance of the roofing unit. Preferably, upper tab section 20 is equal to or slightly greater in length than lower exposed section 24 so as to achieve complete overlapping coverage when installed on to the roof as described below. Most preferably, upper tab section 20 will have a length ranging from 50 to 60 percent, and lower exposed section 24 will have a length ranging from 40 to 50 percent, of the overall unit length. The transverse width of unit 10 will also vary depending upon the desired appearance of the roofing unit, and the transverse width of upper tab and lower exposed sections 20 and 24 will preferably be equal so as to achieve the desired overlapping coverage when installed on the roof.

In the case of simulated cedar shakes as shown in FIG. 1, unit 10 is generally rectangular in shape wherein the overall length of the unit is greater than its transverse width. Preferably, the overall length of the unit ranges from 14 to 30 inches long, and most preferably ranges from 21 to 25 inches in length. The transverse width of unit 10 preferably ranges from 4 to 16 inches, and is most preferably about 6 to 10 inches wide. Of course, it should be understood that different shapes and dimensions of roofing units are contemplated by the present invention. For example, a simulated slate roofing product may instead be relatively square in shape, or have a transverse width greater than the length of the unit, so as to accurately reflect the appearance of slate, for example, when installed on the roof.

Figure 3:
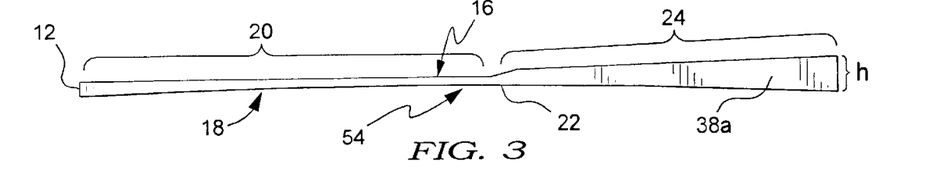
FIG. 3 is a side view of the molded roofing unit of FIG. 1.
Figure 4:
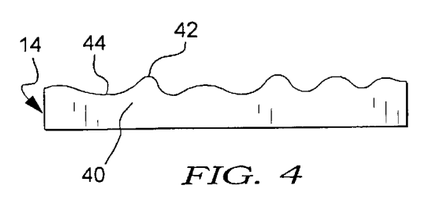
FIG. 4 is a butt end view of the molded roofing unit of FIG. 1.

As best shown in FIG. 3, upper tab section 20 is formed as a relatively thin solid rectangular sheet of molded material. While the specific thickness of the tab section may vary depending upon the application, in typical roofing applications the tab section will have a thickness as measured from top side 16 to underside 18 ranging from 0.125 to 0.250 inches. In a preferred embodiment, upper tab section 20 gradually decreases in thickness from upper end 12 to lower tab end 22 such that top side 16 of tab section 20 slopes downward at a slight angle over this range, such that the thickness preferably decreases to 50 to 75 percent of the thickness of upper end 12. This sloped design enables an overlapping roofing unit to fit more securely over upper tab section 20 when installed on the roof. When secured to the roof, the underside 18 of tab section 20 is uniformly flat so as to rest flush against the roof and or/underlying unit when installed.

Figure 6:
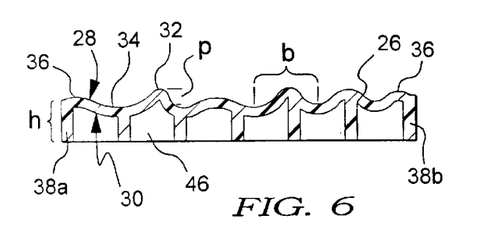
FIG. 6 is a cross sectional view taken along line 6—6 of FIG. 2.

Looking to FIGS. 1, 3 and 6 lower exposed section 24 comprises a top panel 26 of relatively uniform thickness having a top surface 28 and a bottom surface 30. In a preferred embodiment, panel 26 is shaped to include a plurality of generally parallel longitudinal ridges 32 and valleys 34 integrally formed within the panel to give top surface 28 the general appearance of a natural cedar shake. It should be understood that panel 26 may be formed in a different shape and/or have different textural features depending upon the desired appearance of the roofing unit. For example, where a simulated clay tile is desired, panel 26 may be formed as a smooth arched surface extending upwardly from lower tab end 22 to a central apex and downwardly to butt end 14. When a simulated slate roof is instead desired, panel 26 may have a flaked slate surface texture with a rough or jagged outer edge along butt end 14. Thus, panel 26 may be molded in any desired shape and with any desired textural features integrally formed therein.

In the preferred embodiment shown in the drawings, ridges 32 and valleys 34 have an exaggerated height and width greater than that of a natural cedar shake. Referring specifically to FIG. 6, ridges 32 have a relatively broad base b extending between low lying points of the adjacent valleys and relatively high peaks p extending above edge side walls 38 so as to deflect the force of any impact, such as by hail, and distribute the force across a greater surface area of unit 10. Preferably, the height of peak p will be at least 0.275 the width of the respective base b of the ridge, and most preferably the peak to base ratio will be greater than 0.30.

Valleys 34 extend longitudinally and continuously along top panel 26 to direct water flow over the butt end 14 of unit 10. Preferably, the outermost valleys are bordered by upwardly sloped border ridges 36 which direct water inwardly toward the outermost valleys so that water will not flow off the sides of the unit. Most water from rain storms will therefore be directed along the top surface 28 within border ridges 36 of each unit and flow over butt end 14 to the lower exposed section 24 of an underlying unit. The water will therefore be directed along a series of valleys 34 contained in a series of roofing units down the roof until flowing over the lower edge of the roof into the guttering system below.

Looking to FIGS. 3 and 6, edge sidewalls 38a and 38b of relatively uniform thickness extend longitudinally along the sides of lower exposed section 24 from lower tab end 22 to butt end 14. Edge sidewalls 38 extend downwardly a height h from the bottom surface 30 of panel 26 along its outer side edges at a generally perpendicular angle. Sidewalls 38 gradually increase in height from lower tab end 22 to butt end 14 such that top panel 26 is upwardly slanted at a relatively acute angle toward butt end 14. End wall 40 extends downwardly a height h from the bottom surface 30 of panel 26 along the butt end 14 at a generally perpendicular angle.

The height of end wall 40 is at least equal to the maximum height of sidewalls 38 such that the bottom edge of end wall 40 rests flush with the bottom edge of adjacent sidewalls 38. Insofar as panel 26 is of relatively uniform thickness and shaped with ridges 32 and valleys 34, the upper edge of end wall 40 has corresponding ridges 42 and valleys 44 extending above height h. In a preferred embodiment, the total height of a peak, including height h of the endwall, the thickness of panel 26 and peak height p, exceeds 90 percent of the width of base b. In this manner, end wall 40, including ridges 42 and valleys 44, is of sufficient height to be seen from ground level when installed on a roof. Furthermore, the upwardly slanted orientation of panel 26 and the distinctive ridges and valleys formed therein give depth and texture to the appearance of a roof comprising the roofing units.

Figure 5:
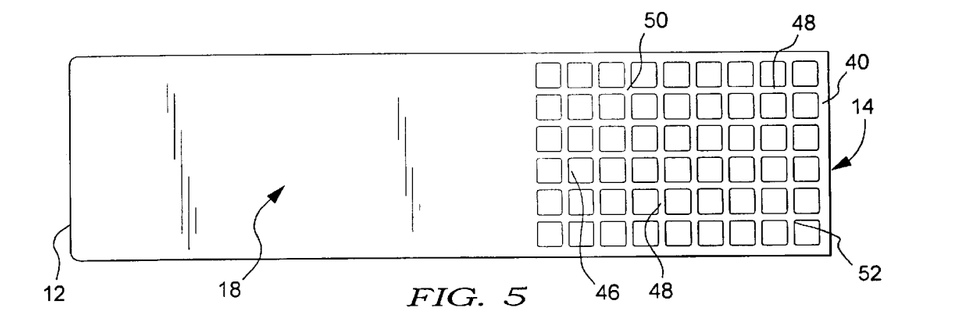
FIG. 5 is a bottom plan view of the molded roofing unit of FIG. 1.

Looking to FIGS. 5 and 6, top panel 26, edge sidewalls 38 and end wall 40 together define a hollow cavity 46 on the underside 18 of lower exposed section 24. Insofar as sidewalls 38 are formed integrally with top panel 26 which is upwardly slanted toward end wall 40, cavity 46 is generally pyramidal in shape. By constructing unit 10 to include cavity 46, unit 10 is constructed of less material than would be required for a solid unit, thereby reducing both material and production costs. Further, a unit containing cavity 46 cools more quickly than a solid unit, providing short cycle times and increasing consistency in the characteristics of the final molded product. Thus, a roofing unit is provided which appears relatively thick from the ground, but is less expensive and more consistent in terms of quality than would be a solid thick molded unit.

To reinforce unit 10, a plurality of reinforcing ribs 48 are preferably integrally formed within cavity 46. Ribs 48 provide support to unit 10 by evenly distributing any force, such as hail or foot traffic, across the entire surface area of the unit. Ribs 48 extend downwardly from bottom surface 30 at a generally perpendicular angle into cavity 46 to form a grid-like pattern of ribs. This grid-like pattern is formed by a series of ribs 48 extending across cavity 46 parallel end wall 40, and a series of ribs 48 extending across cavity 46 parallel sidewalls 38. Other patterns of ribs forming multiple hexagons or triangles may alternatively be used, but such configurations are generally more expensive to tool. The height of ribs 48 as measured from the bottom surface 30 of panel 26 to the bottom of the ribs increases toward butt end 14, such that the bottom edges of the ribs rest flush with the bottom edges of sidewall 38 and end wall 40.

The intersection points 50 at which ribs 48 intersect are particularly susceptible to stress and shear, the ends of the rib segments adjacent each intersection point 50 are preferably built with a radius, meaning built rounded to form reinforcing curvilinear rib walls 52 at the intersection points.

Looking to FIG. 3, unit 10 is slightly arched so as to form an upwardly extending camber 54 along the midsection of unit 10. When roofing unit 10 is nailed to a roof such that the cambered unit is flattened against the roof, and/or an underlying roofing unit, butt end 14 and upper end 12 are held down against the roof by a slight generally downward pressure resulting from the flattened camber 54. As a result of the pressure on ends 12 and 14, high winds generally will not raise the ends of the roofing unit. The force produced as a result of camber 54 eliminates the need for additional interlocking features utilized in some known simulated roofing products to "lock" the edges of one unit to an adjacent unit so that the edges will stay flat against the roof. Thus, camber 54 allows the unit 10 to be installed using a hammer and nails or staple gun in the same manner as traditional cedar shakes. While the height of the camber may vary, it is recommended that the camber height, as measured from a flat surface upon which the unit 10 is supported to underside 18 of the unit at the camber apex, is at least 0.50 inches.

In a preferred embodiment shown in FIG. 1, upper tab section 20 and lower exposed section 24 are divided by index line 56 extending transversely across unit 10 adjacent lower tab end 22. Index line 56 may be formed as a slightly raised or depressed groove within the top side of the unit or may be formed by paint, ink or similar marking materials. As described below, index line 56 is useful in assisting the roofing installer to accurately align the roofing units in an overlapping relationship. In use, the installer will position butt end 14 of a unit 10, along the index line of an underlying unit so that the units are easily squared and aligned.

EXAMPLE

A roofing unit 10 made in accordance with this invention has an overall length of 22 inches extending from upper end 12 to lower butt end 14, and a uniform transverse width of 8 inches. Upper tab section 20 is about 12 inches long extending from upper end 12 to lower tab end 22, and has a maximum thickness as measured from top side 16 to underside 18 of about 0.200 inches at upper end 12. Upper tab section 20 decreases slightly in thickness toward lower tab end 22 such that the top side 16 slopes downwardly toward lower tab end 22 to a thickness of 0.135. An index line is formed as a straight groove extending transversely across the top side 16 of the unit adjacent lower tab end 22.

Lower exposed section is about 10 inches long extending from lower tab end 22 to butt end 14. Top panel 26 extends from lower tab end 22 to butt end 14 and has a relatively constant thickness of about 0.17 inches adjacent lower tab end 22 increasing slightly to about 0.23 inches adjacent butt end 14. Sidewalls 38 extend from lower tab end 22 to butt end 14 and increase in height from about 0.125 inches adjacent lower tab end 22 to about 0.20 inches adjacent butt end 14. The butt end wall 40 similarly has a height of about 0.20 inches, excluding the thickness of panel 26 and the peak height p of ridges 42, such that when combined with the thickness of top panel 26, the average overall height of butt end 14 is about 0.43 ($7/16$) inches. The transverse width of sidewalls 38 and end wall 40 is about 0.3 inches. Ridges 42 have an average peak height of 0.20 inches or greater and ridge base of 0.60 inches or greater. The peaks of the ridges are separated by no more than 1 inch.

Roofing unit 10 is arched along its length so as to form a camber 54 along the midsection of the unit. The height of camber 54 as measured from a flat surface upon which the unit may rest to the inner apex of camber 54 is at least 0.50 inch tall.

The combination of fiber-reinforced plastic with the uniquely configured molded unit results in a roofing unit having an impact resistance rating ranging from a Class 1 rating to a rating greater than Class 4, as measured by UL 2218. This high impact resistance rating equates to a high degree of hail resistance. In a preferred embodiment of the invention, the molded roofing unit has an impact resistance rating in the range of Class 2 to 4, with the most preferred embodiment achieving an impact resistance rating equal to or greater than Class 3.

The molded roofing unit of the present invention also has a high flex modulus that provides a high degree of wind resistance to the roofing unit. A molded roofing unit consistent with the present invention can withstand winds ranging from 80 to over 150 miles per hour (mph) as tested by UL 997. The preferred embodiment of the unit can withstand wind speeds between 90 and 130 mph, and the most preferred embodiment can withstand wind speeds of 110 mph and greater.

The molded fiber-reinforced plastic roofing product of the present invention has a fire resistance rating ranging from Class A to Class C, as measured by ANSI/UL 790. Class C is the equivalent of a residential roofing rating. The preferred embodiment of the roofing unit has at least a Class C fire rating.

Method for Making Molded Roofing Units

The preferred method for producing the molded roofing units of the present invention may be divided into a first phase of making the fiber-reinforced plastic composition and a second phase of producing the molded final product.

The method for making the fiber-reinforced plastic composition preferably comprises the steps of preparing the plastic, preparing the fibers, combining the plastic and fibers to produce fiber-reinforced plastic pellets, and drying the pellets.

Preparation of the plastic includes selecting the plastics to be utilized, cleaning the plastic if recycled plastic is used and grinding the cleaned plastic. When post consumer and/or post industrial plastics are used, the polymers selected must be consistent in quality and characteristics and should be miscible, so that the molten polymers will flow together well and there will be no separation of polymers during any phase of production. Differences in melting point between the various plastics used can create difficulties during processing of the plastic and can result in a non-uniform finished product. Specifically, one polymer may become overheated before another reaches a workable melt flow, leading to improper product formation or inconsistent physical properties in the final product. Shrinkage of the final product can also occur due to different polymer melt and flow rates thereby causing warping, problems with ejection of parts from tooling and other problems. The melting points of the various plastics used preferably range between 5° and 75° F. and most preferably between 0 and 30° F. The melt index of each is preferably within 1 to 25 percent of one another and most preferably within 0 to 10 percent.

Foreign matter should be removed before the plastic is processed, especially when waste plastics are selected for inclusion in the fiber-reinforced plastic composition. Washing of waste plastics enables the purchase of inexpensive uncleaned waste plastics for use in the composition. Magnetic or similar devices may be used to remove metal contaminants. If not removed, metal contaminants can cause damage to the extruder and injection molding machines utilized in the production process. Heavy contaminates may be removed by a wash system, screen packs, and/or float sink operations.

The cleaned plastics are then ground to a size of under 0.75 (¾) inch and preferably between 0.25 (¼) and 0.50 (½) inch in both length and width. Oversized particles may be removed by passing the ground particles through a classifier. The ground plastic is then stored until it is combined with the treated fibers.

The process for preparing the fibers includes removing contaminants, grinding the fiber, partially delignifying the fiber and optionally further treating the fibers to enhance bonding characteristics. Contaminants, such as metal, undesirable wood particles, plastic, stones, and dirt are removed from the fibers. As with the plastics, metal contaminants may be removed by magnetic devices to prevent damage to the extruders and injection molding machines. The clean fibers are then ground to sizes ranging from 0.1 to 0.6 inch in length and preferably being under approximately 0.375 (⅜) inch in length. The grinding may be accomplished using a tub grinder and/or a hammermill, or by any other means known in the art.

The fibers are then partially delignified to enhance their ability to bind to the polyolefin components of the composition. The preferred method of delignification utilizes a steam explosion process in which the individual fibers expand upon exiting the high pressure steam chamber as disclosed in the Tyson '216 Patent or in the DeLong Patents, each of which is incorporated herein by reference.

Although not wishing to be limited to any one theory, it is believed that the steam explosion process disrupts the lignin-cellulose linkages within and between the fibers and partially disrupts the lignin contained therein. It is believed that the pressure differential between the interior and exterior of the extruder barrel causes the fibers to "expand" rapidly as they exit the extruder. This expansion further disrupts the lignin-cellulose linkages within and between the fibers, such that the individual cellulosic fibers separate and open into an expanded micromesh matrix of cellulosic fibrils and micro fibrils, having a fiber surface area much greater than that of an untreated lignocellulosic fiber. When the expanded fiber is mixed with the polyolefin, the polymer is able to flow into the micromesh matrix and bond with the fibrils and microfibrils. Although the process partially delignifies the fibers, some lignin remains in the fiber and can naturally adhere to the polyolefin.

The partially delignified fiber optionally may be further treated to enhance bonding characteristics, such as by neutralizing the pH of the fiber, drying the fiber, mechanically fibrillating the fiber, and/or incorporating a bonding agent such as Epolene. The preferred method of neutralizing and drying is fully disclosed in the Tyson '216 Patent, incorporated herein by reference. The fibrillation step preferably comprises running the fibers through a hammermill, a rotating drum dryer and /or any other known fibrillator to remove any lumps in the processed fiber and to achieve the desired fiber size. It is believed that fibrillation dissociates and desegregates the individual fibers and the fibrils that form the micromesh matrix, thereby further increasing the amount of surface area that is available to bind with the polyolefin. As with the pre-processed fibers, the aspect ratio of the fibers should be between 60 and 100, more preferably between 80 and 130, and most preferably between 90 and 120. In a preferred embodiment, approximately 75 percent of the processed fibers will pass through a 100 mesh screen.

The processed fiber and the plastic are compounded in an extruder compounder. The desired amounts of the processed fiber, ground plastic, U-V protectants, bonding agent, and other additives, with the exceptions of the foaming agent which is added later in the process may be fed into the extrusion compounder. The components are preferably pre-dried in a desiccant dryer to a moisture content of less than 2 percent by weight of the total composition before feeding into a non-vented extruder barrel. If the components are not so dried, a vented extruder barrel must be used.

The barrel configuration includes a mixing screw with a length to diameter ratio of at least 28:1 and the extruder is preferably equipped with a die to form strands. The screw has a mixing section in which the polymers and fibers receive more shear and blending. Any suitable extruder known in the art that meets these specifications may be utilized to produce the fiber-reinforced plastic utilized in the present invention. The extruder may additionally comprise a blister pack located on the screw to pull volatiles from the compound, thereby reducing the amount of gas that is passed through to the end product.

The fiber-reinforced plastic composition exits the extruder in strands that must be cooled, dried, and cut to size. The cooled strands are dried to a moisture content of less than 11 percent by weight of the total composition with the preferred moisture content under 5 percent by weight of the total composition. The composition is then pelletized using any technique known in the industry that will produce pellets of a consistent size, preferably approximately 0.125 (⅛) inch in diameter and less than 0.125 (⅛) inch in length. The fiber-reinforced plastic composition pellets may be shipped and/or stored for use in the second molding phase of the preferred process.

In the second phase of the preferred process, the final molded roofing units are produced from the fiber-reinforced plastic composition. The preferred molding process comprises further drying the fiber-reinforced plastic composition pellets, melting the composition in an injection molding machine, injecting the melted composition into roofing unit molds, cooling the melted composition until at least partially hardened sufficient to retain a shape, and removing the units from the molds. Optionally, the molded units may be only partially hardened in the mold and the partially hardened units may be placed on cooling fixtures, which fixtures may bend the units to produce a camber in the final molded roofing unit.

The composition pellets are preferably dried to a moisture content of less than 2 percent unless a vented injection barrel will be used for the injection molding or compression molding will be used. When a non-vented injection barrel is used, the moisture content of the pellets is important. Failure to adequately dry the pellets, which have a high fiber content, may cause explosions in the barrel that may lead to pre-ejection of hot plastic when the injection nozzle is not engaged with the mold sprue or when the mold is open, or may lead to air pockets in the final product.

The pellets are preferably dried in large desiccant dryers, although any suitable dryer known in the art that will dry the composition to under 2 percent moisture by weight may be employed. The temperature in the dryers is preferably kept between 175 and 250° F. At temperatures over 250° F., the pellets will become hot enough to fuse together into lumps. When the temperature is below 175° F., the drying time is long, throughput is low, and, as a result, the cost of the processing increases. A temperature range of 175 to 250° F. produces optimal energy output and minimal residence time to achieve the desired drying of the composition pellets.

The dried fiber-reinforced plastic composition pellets are preferably melted and molded into a roofing unit of the desired configuration. The molding process is preferably performed using injection molding, although utilizing non-pressurized melting followed by compression molding is also contemplated by this invention.

The dried fiber-reinforced plastic composition pellets are fed into an injection molding machine. If colorant was not added during the extrusion step it may be fed into the injection molding machine with the composition pellets. Further, if a foaming agent is desired, it is also metered into the throat of the injection molding machine with the composition pellets, preferably using a ratio loader such as Model SRL-1 produced by Plasti-Equip.

Consistent with the preferred method, injection molding machines may be used in conjunction with multi-cavity molds, and preferably a multi-cavity stacked mold is used to exploit the economies of scale provided by such molds. However, the roofing unit may be constructed using a single cavity conventional mold or any other suitable mold type known in the art.

The barrel temperature of the injection molding machine, as well as the temperature of the fiber-reinforced plastic composition, must be maintained between 325° and 393° F. and most preferably between 340° and 390° F., the narrow temperature range in which the plastic, the fibers, and any added fire retardant are thermally stable. The fire retardant ATH loses its fire resistance properties at 393° F., and at temperatures over 400° F., the fiber begins to degrade. Degradation of the fiber will lessen the amount of reinforcement provided to the roofing unit. Further, fiber degradation generates volatile gases, thereby producing results similar to those produced by the use of composition pellets having greater than 2 percent moisture, discussed above.

In a preferred method, the various zones of the injection molding barrel have different temperatures. The rear zone of the barrel, through which the composition first passes, has temperatures ranging from 325 to 390° F., with the preferred temperature ranging from 350 to 370° F. The middle zone of the barrel has temperatures ranging from 335 to 390° F., with the preferred temperature ranging from 355 to 375° F. The front zone of the barrel has a preferred temperature range from 325 to 390° F., similar to the rear zone of the barrel. The nozzle of the injection molding apparatus, adjacent the front zone of the barrel, has a preferred temperature in the range of 330 to 390° F., with a more preferred temperature ranging from 350 to 380° F. Finally the mold into which the melted composition is injected is much cooler, having a preferred temperature range from 60 to 135° F., with the more preferred temperature ranging from 95 to 115° F.

The narrow range of operating temperatures precludes use of a number of polymers, such as ABS, some nylons, polyamide-ide, polycarbonate, many polyesters, and polyethylene terephthalate (PET). Care must be exercised to keep the composition within the desired temperature range, not just the barrel. For example, when filling multi-cavity molds, large amounts of composition are injected. If injection occurs too rapidly (over 80 ounces of composition in less than 10 seconds) excess mechanical heat may be generated and the composition will scorch.

On the other hand, the injection speed must be relatively fast, preferably filling roughly 6.5 ounces per second, in order to allow the thin end of the mold (e.g. the upper tab section 20) to completely fill before hardening of the composition in the mold begins. The mold is preferably fan-gated on the side, thereby orienting most of the fibers along the exposed portion of the roofing unit, parallel to the longitudinal axis of the unit, to provide the desired mechanical properties. Other gating known in the art to achieve this preferred fiber orientation may be used.

The mold can be designed to construct a roofing unit similar in appearance to a cedar shake, slate, tile, or any other suitable configuration, while incorporating other functional and cost effective features, as described above. The mold design is critical to both the final shape of the product and to the cycle times. The mold also contains cooling passages, which will be known by those of ordinary skill in the art to be channels through which cold water flows to remove heat from the molded product, thereby decreasing the time required for the composition to set, and allowing the finished product to be removed from the mold rapidly while retaining its shape.

The mold is constructed to provide a molded roofing unit product configured as described earlier above. While the cavity 46 in the underside of roofing unit 10 serves to reduce the cooling time of the thicker lower exposed section 24, the lower exposed section still requires more cooling time than the thinner upper tab section 20. The configuration of water cooling passages must be designed to account for this difference in thickness as well as the pattern of ribs 48 within cavity 46. The cooling passages are preferably constructed to remove more heat from the thick lower exposed section 24 than from the thin upper tab section 20, thereby producing a uniformly cooled product.

In a preferred embodiment, the roofing unit is removed from the mold when the unit has sufficiently hardened to retain its molded shape, but before the unit has filly hardened. The partially hardened unit is transferred directly to a cooling fixture that is designed to prevent the unit from warping and twisting so as to maintain the shape of the unit until the composition is fully hardened and cured. In the preferred embodiment, the fixtures hold the unit from the time it is removed from the mold until the unit is completely cooled and hardened. The fixtures contribute to short cycle times by allowing the unit to be removed from the mold before it is completely cooled and hardened. Shorter cycle times decrease the costs of production since more units can be produced in a shorter time.

Additionally, in a preferred embodiment the fixtures are constructed to slightly bend the midsection of the roofing unit 10 during cooling to produce camber 54 near the midsection of the roofing unit. In one method consistent with the present invention, the fixture holds the upper tab section 20 of the unit while allowing the lower exposed section 24 to hang over the edge of the fixture, thereby creating a bend, or camber, in the unit. Of course, it should be understood that other means known in the art for bending or arching a molded product may alternatively be used to produce the camber 54. Alternatively the camber may be built into the mold or may be created by the arrangement of the shakes when bundled together for shipment and storage.

Method of Installing the Molded Roofing Unit

A roofing unit consistent with the present invention can be affixed to a roof in the same general manner as a conventional roofing unit is installed. The roof surface on which the roofing units are installed is typically interlaced with Type 30 felt paper and no underlayment is required. Due to the stiffness of the molded roofing unit, roofing units consistent with the present invention may be applied on spaced sheath roofing or solid decking. Further, unlike cedar shakes, nails should not split the molded roofing units of the current invention, thereby reducing waste resulting from discarded broken roofing units. The nail holding capacity of the fiber-reinforced plastic composition is superior to that of wood shakes and other known plastic and/or composite roofing compositions and therefore the units are more resistant to high winds. Additionally, the inherent nature of polyethylene to "creep," or settle, causes the roofing unit of the present invention to "self seat". As the polyethylene creeps, it settles onto itself rather than drooping on the sides, thereby adding to the stability of the unit on the roof.

Index line 56, a reference mark on the roofing unit, further increases the ease of installation. Cedar shakes and most other non-plastic products do not contain such a line. Looking to FIG. 7, to install roofing units containing such an index line, the roofer begins by installing a plurality of roofing units in a first row along the lowest edge of the roof. A second upper row, comprising a plurality of roofing units, is then installed such that lower exposed sections 24 of the roofing units of the second upper row are placed in an overlapping relationship with upper tab section 20 of the roofing units of the first row. The upper row is installed such that lower exposed sections 24 cover the upper tab sections 20 of the first row. The third row is installed in the same manner as the second, and additional rows are similarly installed until the roof is covered. After all roofing units are installed, butt ends 14 and top surfaces 28 of lower exposed sections 24, including any ridges and valleys, of nearly all of the roofing units are visible to a person standing on the ground, providing an aesthetically pleasing appearance.

Figure 7:
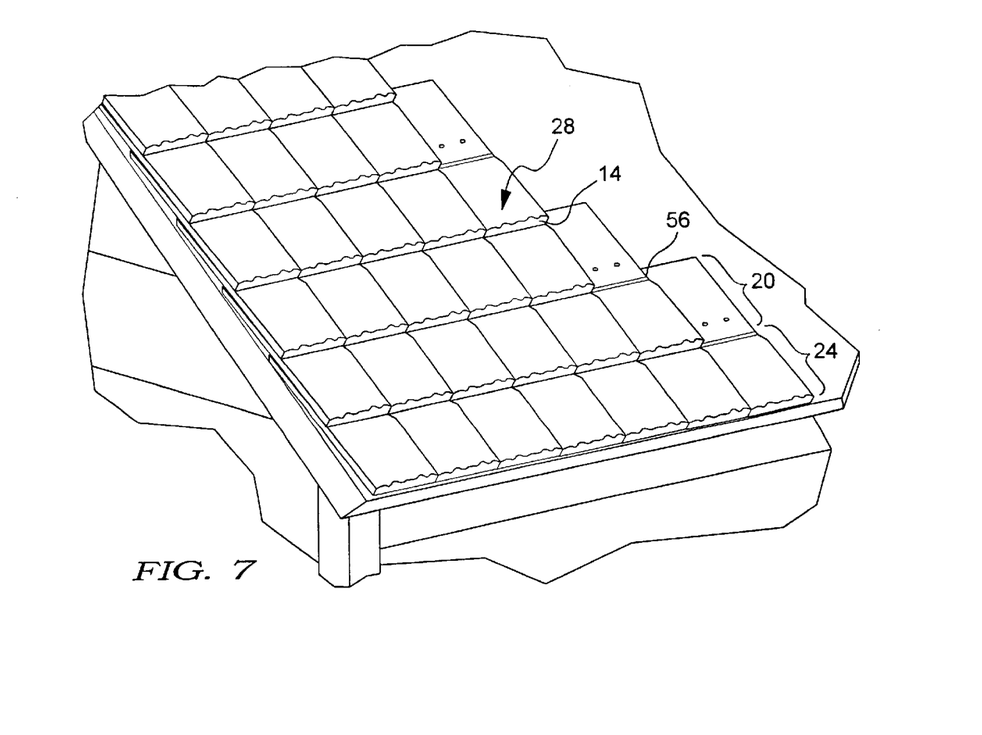
FIG. 7 is a perspective partial view of a building roof with a plurality of molded roofing units secured on the roof in accordance with the present invention.

The roofer uses index line 56 to determine the correct amount of overlap between rows of roofing units and to keep the roofing units running square on the roof. Using the index line, the roofer merely installs the upper row of roofing units so that the butt end 14 of the upper roofing units just cover the index line of the roofing units comprising the row below. As a result, the upper row of roofing units is parallel to the lower index line across the entire length of the roof producing a professional appearance. Without this index line, roofers must either measure and square each roofing unit or estimate the length of exposure and the square placement of the units.

Use of a fiber-reinforced plastic molded roofing unit consistent with this invention produces less waste than use of cedar shakes due to a low occurrence of splitting of the plastic during shipment and installation. Further, because the roofing units are molded, they contain few imperfections and nearly all of the molded roofing units that are produced are useable and of a correct size. Finally, because the molded roofing units are recyclable, any waste that is produced may be ground and reused to produce new molded roofing units. Such waste reduction is very desirable and conserves natural resources.

In one embodiment of the present invention described above, the roofing units are generally shaped like a cedar shake. Not only are the simulated shakes drop-in replacements for cedar shakes with respect to installation, but the appearance, packaging, shipping, palleting, and bundling are already well known to roofers. In addition, because the shakes of the present invention are more durable than cedar shakes, few shakes are damaged during loading and shipping thereby reducing waste over cedar shakes which readily split during shipment and installation.

The preferred embodiments directed to cedar shakes with magnified ridges described above are illustrative only. Numerous changes, modifications, and alterations will be contemplated by those skilled in the art without departing from the spirit and scope of the novel concept of this invention. For example, other methods for producing the fiber reinforced plastic composition and/or roofing unit are contemplated by this invention. Furthermore, roofing units of different configuration having the claimed features are contemplated in this invention. The scope of the invention is limited only by the appended claims and any modifications within the scope of the claims.

What is claimed and desired to be secured by Letters Patent is as follows:

1. A method for making a molded roofing unit from a fiber-reinforced plastic composition, said method comprising:

drying a fiber-reinforced plastic composition to a water content ranging from 0 to 2 percent by weight, said composition comprising a polyolefin blended with fibers that have been at least partially delignified, wherein said polyolefin is selected from the group consisting of polyethylene and polypropylene;

melting said composition in an injection molding machine until liquefied to a temperature ranging from 325 to 393° F.

injecting said melted composition into a mold configured to form a molded roofing unit, wherein said composition is injected into said mold through a gated structure to orient the fibers within the molded unit in a longitudinal position relative to the length of the roofing product;

cooling said melted composition until said molded roofing unit is formed; and removing said molded unit from said mold.

2. The method for making a molded roofing unit of claim 1, wherein said removing step comprises removing said molded unit from said mold before said molded roofing unit is completely hardened, and placing said molded unit on a fixture until said unit is fully cooled and hardened, wherein said fixture is designed to form a camber in said roofing unit.

3. The method for making a molded roofing unit of claim 1, further comprising forming a camber in said molded unit.

4. The method for making a molded roofing unit of claim 1, wherein said cooling step further comprises passing cold water through cooling passages within said mold.

* * * * *

UNITED STATES PATENT AND TRADEMARK OFFICE
CERTIFICATE OF CORRECTION

PATENT NO. : 6,290,885 B1  
DATED : September 18, 2001  
INVENTOR(S) : Roetheli et al.

Page 1 of 1

It is certified that error appears in the above-identified patent and that said Letters Patent is hereby corrected as shown below:

<u>Column 15,</u>  
Line 30, delete "filly" and insert -- fully -- therefor.

Signed and Sealed this

Twenty-sixth Day of March, 2002

Attest:

*Attesting Officer*

JAMES E. ROGAN  
*Director of the United States Patent and Trademark Office*